(12) United States Patent
Van Allen

(10) Patent No.: US 6,595,158 B1
(45) Date of Patent: Jul. 22, 2003

(54) BIRD FEEDER CONSTRUCTION

(76) Inventor: Gordon R. Van Allen, 861 Burksdale Rd., Norfolk, VA (US) 23518

( * ) Notice: Subject to any disclaimer, the term of this patent is extended or adjusted under 35 U.S.C. 154(b) by 0 days.

(21) Appl. No.: 10/187,096

(22) Filed: Jul. 1, 2002

(51) Int. Cl.[7] .............................................. A01K 61/02
(52) U.S. Cl. ................................... 119/52.2; 119/51.01
(58) Field of Search .......................... 119/51.01, 52.2, 119/57.8, 58, 61, 52.1

(56) References Cited

U.S. PATENT DOCUMENTS

| | | | |
|---|---|---|---|
| D271,434 S | * 11/1983 | Love | D30/128 |
| 4,664,066 A | 5/1987 | Steuernagel et al. | 119/52 |
| 4,712,512 A | 12/1987 | Schreib et al. | 119/52 |
| 4,732,112 A | 3/1988 | Fenner et al. | 119/52 R |
| 5,195,463 A | 3/1993 | Lorenzana | 119/77 |
| 5,488,927 A | * 2/1996 | Lorenzana et al. | 119/51.5 |
| 6,349,673 B1 | * 2/2002 | Schumann | 119/52.2 |

* cited by examiner

Primary Examiner—Charles T. Jordan
Assistant Examiner—Judith A. Nelson
(74) Attorney, Agent, or Firm—Sturm & Fix LLP

(57) ABSTRACT

A bird feeder construction (10) wherein, a conventional transparent beverage receptacle (100) forms the seed dispensing unit (12) which is captively engaged in a framework member (40) attached to a base member (20) wherein, the framework member (40) includes a front wall (45) and a rear wall (41) that engage the front and rear of the neck portion (101) of the beverage receptacle (100) which is penetratingly engaged by a rod member (50) that extends through the front (45) and rear (41) walls and a pair of cross-arm elements (47) (47) which are disposed on top of the front (45) and rear (41) walls to provide lateral support to the beverage receptacle (100) in its vertically upright position.

8 Claims, 3 Drawing Sheets

BIRD FEEDER CONSTRUCTION

CROSS REFERENCE TO RELATED APPLICATIONS

This invention was the subject matter of Document Disclosure Program Registration #497955, filed in the U.S. Patent and Trademark Office on Aug. 6, 2001.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of bird feeder arrangements in general; and in particular to a bird feeder construction whose bird feed dispenser is fabricated from a conventional beverage receptacle.

2. Description of Related Art

As can be seen by reference to the following U.S. Pat. Nos. 5,195,463; 4,664,066; 4,712,512; and, 4,732,112, the prior art is replete with myriad and diverse suspended bird feeder arrangements.

While all of the aforementioned prior art constructions are more than adequate for the basic purpose and function for which they have been specifically designed, they are uniformly deficient with respect to their failure to provide a simple, efficient, and practical bird feeder construction that is cheap and easy to fabricate, and which employs a conventional transparent beverage receptacle as the seed dispensing reservoir.

As most bird fanciers are all too well aware, most commercially available bird feeders are very expensive to purchase which limits their widespread usage and minimizes the number of birds that can be attracted to a particular viewing location.

As a consequence of the foregoing situation, there has existed a longstanding need among bird lovers for a new and improved bird feeder construction that is quick, easy and inexpensive to build thereby assuring its widespread acceptance and usage; and the provision of such a construction is a stated objective of the present invention.

BRIEF SUMMARY OF THE INVENTION

Briefly stated, the bird feeder construction that forms the basis of the present invention comprises in general: a base unit; a feed dispensing unit; and a stabilizing support unit for the feed dispensing unit wherein, the feed dispensing unit comprises a slightly physically altered conventional beverage receptacle preferably fabricated from transparent plastic so that the feed level within the feed dispensing unit is readily apparent.

As will be explained in greater detail further on in the specification, the base unit comprises a general flat rectangular base member which the stabilizing support unit rests upon and is operatively connected thereto.

The stabilizing support unit comprises in general a framework member having a front wall which is slidably received within a pair of side walls fixedly secured to a rear wall; wherein, both the front and rear walls are provided with opposed apertures that are adapted to engage the front and rear sides of the neck portion of a conventional beverage receptacle; and wherein, the opposed apertures are adapted to receive an elongated rod member that penetratingly engages the neck portion of the beverage receptacle to pivotally suspend the beverage receptacle within the framework member.

In addition, the framework member also includes a pair of cross-arm elements attached to the front and rear walls of the framework member; wherein, the cross-arm elements frictionally engage the opposed sides of the neck portion of the beverage receptacle to maintain the beverage receptacle in a vertically upright position to dispense the seed onto the base member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
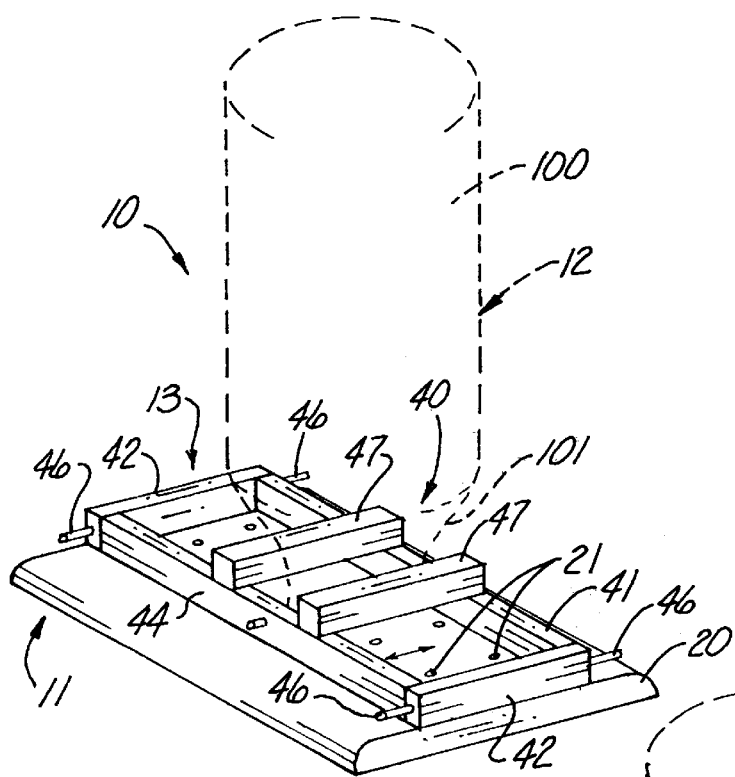
FIG. 1 is a perspective view of the bird feeder construction that forms the basis of the present invention.

As can be seen by reference to the drawings, and in particularly to FIG. 1, the bird feeder construction that forms the basis of the present invention is designated generally by the reference number 10. The construction 10 comprises in general a base unit 11, a feed dispensing unit 12, and a stabilizing unit 13 for supporting the feed dispensing unit 12 relative to the base unit 11. These units will now be described in seriatim fashion.

Figure 2:
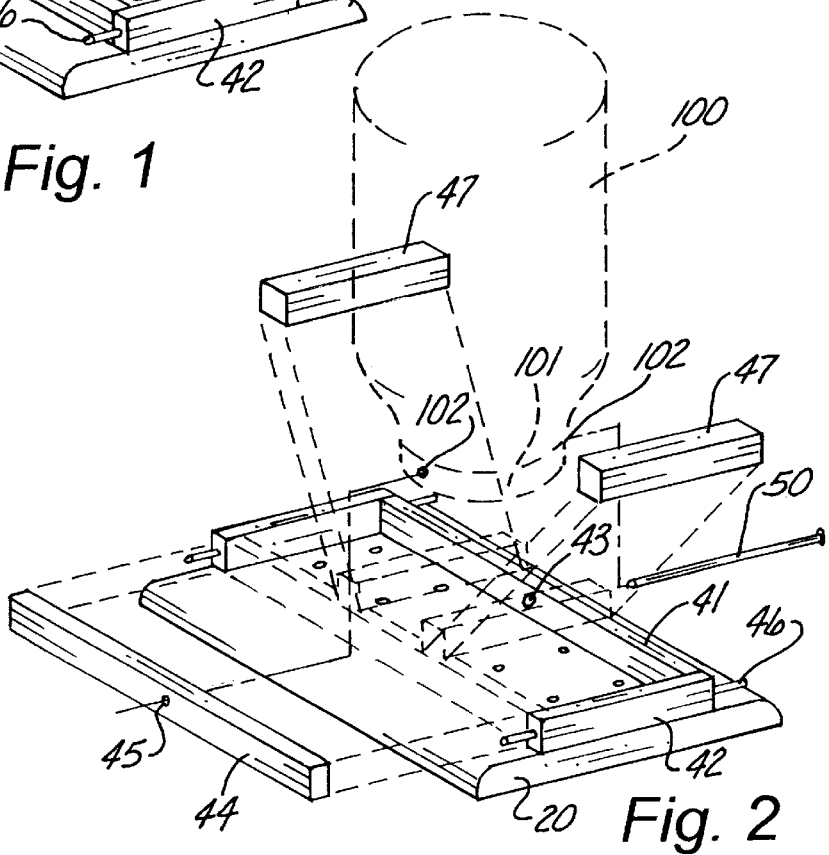
FIG. 2 is an exploded perspective view of the bird feeder construction.
Figure 3:
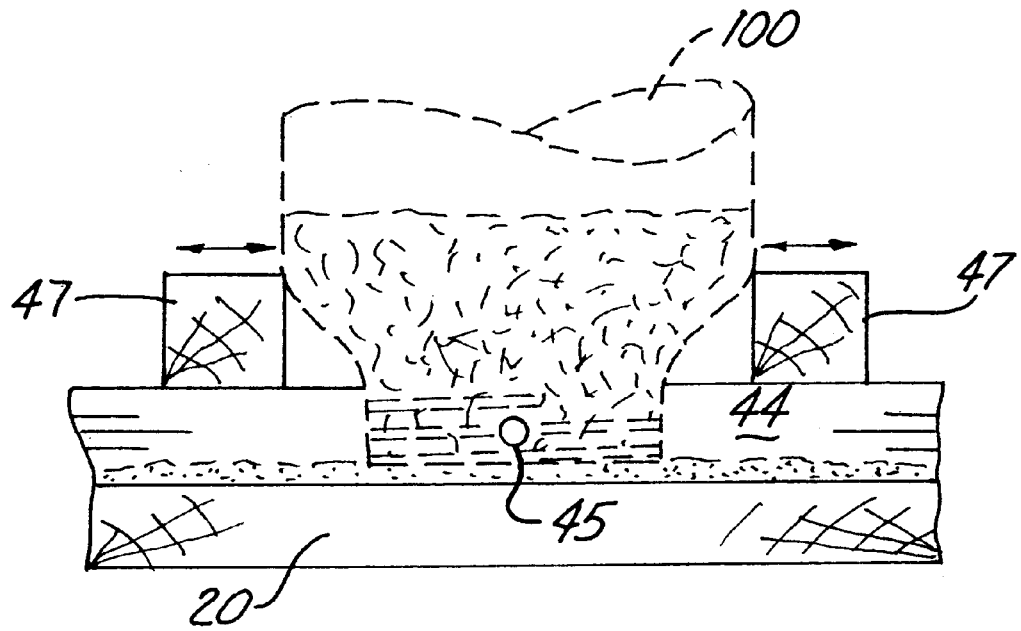
FIG. 3 is a front detail view of the stabilizing support unit cooperating with the feed dispensing unit.

As shown in FIGS. 1 and 2, the base unit 11 comprises a generally flat rectangular base member 20 provided with a plurality of discrete drain apertures 21 that will prevent water from accumulating on the top surface of the base member 20.

As can also be appreciated by reference to FIGS. 1 and 2, the feed dispensing unit 12 comprises a conventional transparent plastic beverage receptacle 100 having a threaded neck portion 101 which is modified in accordance with the teachings of this invention by the formation of a pair of diametrically opposed mounting apertures 102 in the threaded neck portion 101 of the beverage receptacle 100 for reasons that will be explained presently.

Turning now to FIGS. 1 through 4, it can be seen that the stability unit 13 comprises a framework member designated generally as 40 and comprising a rear wall 41 and a pair of sidewalls 42 42 arranged in a generally elongated U-shaped configuration and fixedly secured to the top surface of the base member 20; wherein, in the preferred embodiment of the invention, the rear wall 41 is provided with a central aperture 43 and the opposite ends of the sidewalls 42 42 are provided with outwardly projecting dowels 46 that function as perches for birds to land upon.

Figure 4:
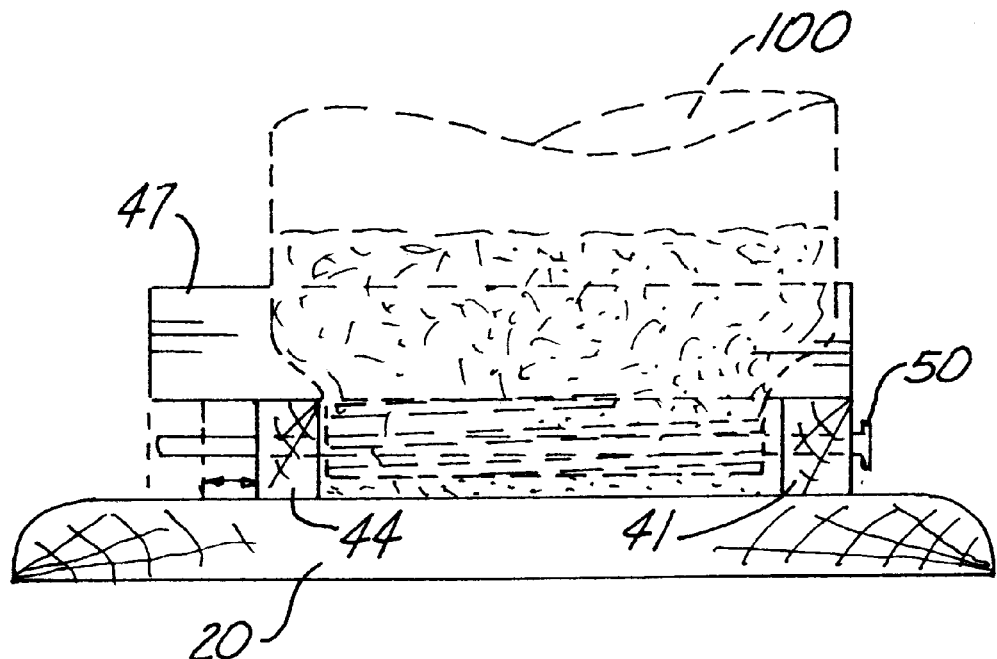
FIG. 4 is as side detail view of the stabilizing support unit cooperating with the feed dispensing unit.

In addition, as can best be appreciated by reference to FIGS. 2 and 4, the framework member 40 further includes a front wall 44 dimensioned to be slidably received between the opposed side walls 42 42 wherein the front wall 44 is also provided with a central aperture 45 that is aligned with the central aperture 43 formed in the rear wall 41 for reasons that will likewise be explained presently.

Still referring to FIGS. 1 through 4, it can be seen that the framework member 40 further comprises a pair of lateral stabilizing wall elements 47 which rest on top of the front 44 and rear 41 walls and are adapted to engage and support the opposed sides of the threaded neck 101 of the feed receptacle 100.

Furthermore, the stabilizing unit 13 also comprises an elongated rod member 50 which is dimensioned to pass through the opposed apertures 102 in the neck 101 of the beverage receptacle 100 as well as the central apertures 45 and 43 in the front 44 and rear 41 walls of the framework member 40 to pivotally suspend the receptacle 100 relative to the framework 40.

At this juncture, the front wall 44 is slid rearwardly to captively engage the front and back of the neck portion 101 of the receptacle 100 between the front 44 and rear 41 walls of the framework member 40. Since this arrangement obviously introduces lateral instability to the beverage receptacle, it is necessary for the framework member 40 to further include a pair of cross-arm elements 47 47 that are releasably attached to the top surface of the front 44 and rear 41 walls wherein, the sides of the cross-arm elements 47 47 are brought into frictional engagement with the opposite sides of the neck portion 101 of the beverage receptacle 100 to maintain the beverage receptacle 100 in a vertically upright dispensing position.

Figure 5:
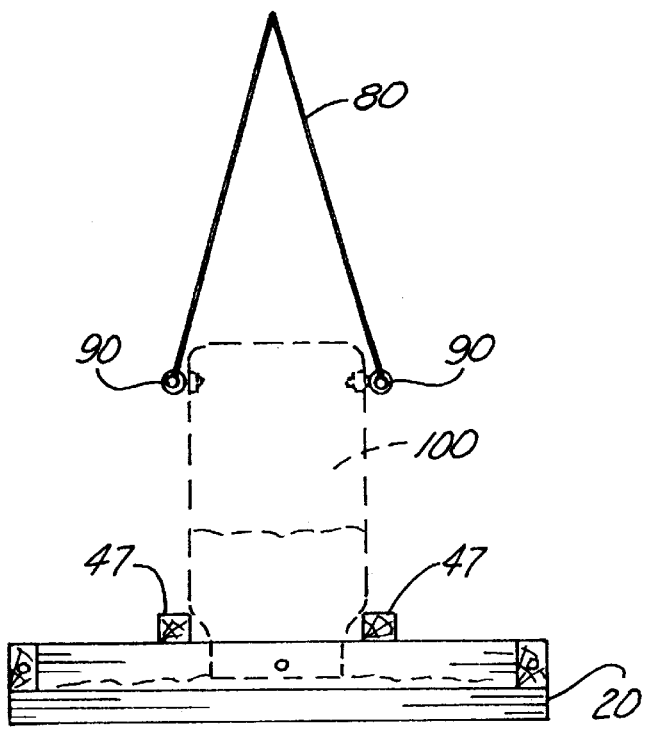
FIG. 5 is a depiction of one version of a suspension arrangement for the bird feeder construction.
Figure 6:
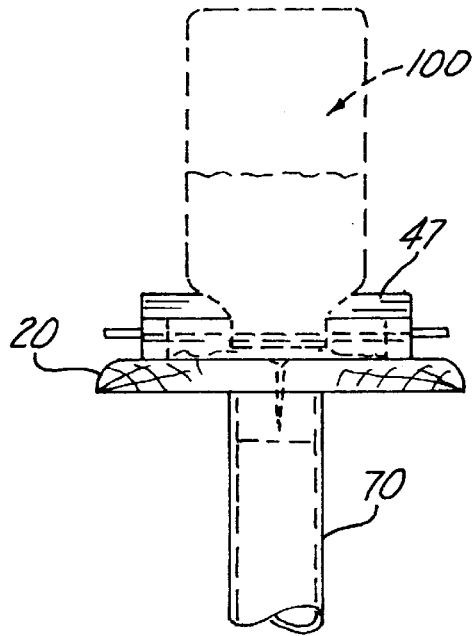
FIG. 6 is a depiction of the bird feeder construction mounted on top of a pole; and, FIG. 7 is a depiction of another version of a suspension arrangement for the bird feeder construction.
Figure 7:
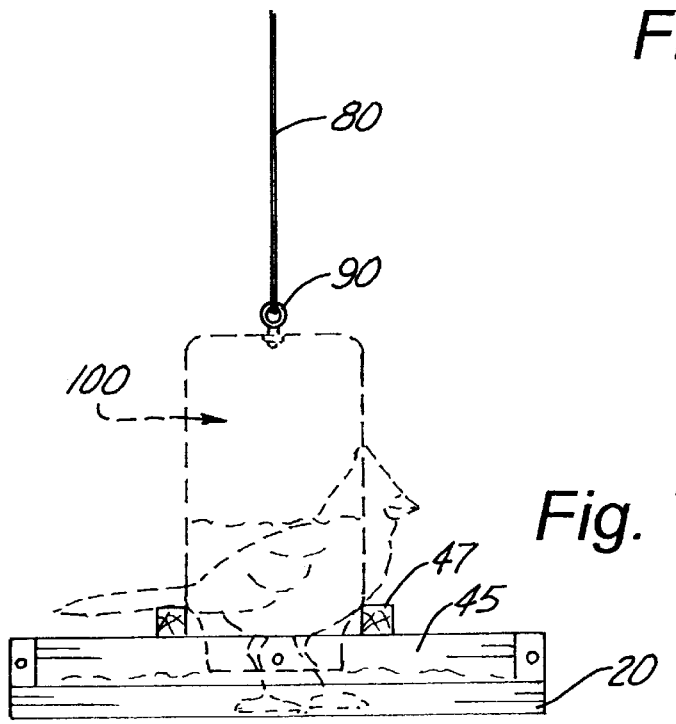

While the basic structure of the bird feeder construction 10 has been described so far, reference should be made to FIGS. 5 through 7, which illustrate three of the preferred methods of mounting the feeder construction 10 at an elevated height.

As shown in FIGS. 5 and 7, the beverage receptacle 100 may be vertically suspended by installing two eyelets 90 on opposite sides of the beverage receptacle 100 proximate its inverted bottom and employing a tether member 80 fabricated from wire or string, the opposite ends of which are attached to the opposed eyelets 90 to suspend the construction from a hook or the like (not shown).

In the alternative, the inverted bottom of the beverage receptacle 100 may be provided with a single centrally disposed eyelet 90 which is subsequently attached to one end of an elongated tether member 80, the opposite end of which is attached to an overhanging limb or other suitable elevated surface.

Finally, as depicted in FIG. 6, the bottom of the base member 20 may be fixedly secured to and supported by the top of a pole member 70 preferably fabricated from plastic tubing or the like to prevent squirrels from gaining access to the bird feeder construction 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A bird feeder construction comprising
    a feed dispensing unit including a conventional transparent plastic beverage receptacle having a neck portion;
    a base unit including a generally flat base member;
    a stabilizing unit including a framework member disposed intermediate and operatively associated with both the feed dispensing unit and the base unit wherein, the framework unit includes a front wall and a rear wall adapted to frictionally engage the front and rear of the neck portion of the beverage receptacle; and further includes a pair of cross-arm elements adapted to frictionally engage the opposed sides of the neck portion of the beverage receptacle.

2. The construction as in claim 1; wherein, the cross-arm elements are affixed to and are supported by the top surface of the front and rear walls.

3. The construction as in claim 2; wherein, the framework unit further includes a pair of side walls affixed to the rear wall and the front wall wherein the side walls, the front end rear walls and the base member define a reservoir for seed dispensed from the beverage receptacle.

4. The construction as in claim 1; wherein, both the front wall and the rear wall are provided with aligned apertures.

5. The construction as in claim 4; wherein, the stabilizing unit further includes an elongated rod member adapted to penetratingly engage the neck portion of the beverage receptacle and pass through the aligned apertures in the front and rear walls of the framework member.

6. The construction as in claim 3; wherein, both the front wall and the rear wall are provided with aligned apertures.

7. The construction as in claim 6; wherein, the stabilizing unit further includes an elongated rod member adapted to penetratingly engage the neck portion of the beverage receptacle and pass through the aligned apertures in the front and rear walls of the framework member.

8. The construction as in claim 7; wherein, selected ones of the front, rear, and opposed side walls of the framework member are provided with outwardly projecting dowels.

* * * * *